United States Patent [19]
Lowe

[11] Patent Number: 5,561,343
[45] Date of Patent: Oct. 1, 1996

[54] SPACERS FOR FLAT PANEL DISPLAYS

[75] Inventor: Anthony Lowe, Braishfield, United Kingdom

[73] Assignee: International Business Machines Corporation, Armonk, N.Y.

[21] Appl. No.: 213,346

[22] Filed: Mar. 15, 1994

[30]     Foreign Application Priority Data

Mar. 18, 1993  [GB]  United Kingdom .................. 9305562

[51] Int. Cl.$^6$ ..................................................... H01J 31/00
[52] U.S. Cl. ............................ 313/482; 313/496; 445/24
[58] Field of Search .................................. 313/482, 586, 313/495, 496, 497; 445/24, 25

[56]                    References Cited

U.S. PATENT DOCUMENTS

| | | | |
|---|---|---|---|
| 3,788,722 | 1/1974 | Milgram | 445/25 |
| 3,904,905 | 9/1975 | Watanabe et al. | 313/586 |
| 4,024,613 | 5/1977 | Martel et al. | |
| 4,071,287 | 1/1978 | Sherk | 445/25 |
| 4,108,521 | 8/1978 | Wicher, Jr. | 445/25 |
| 4,124,926 | 11/1978 | Kupsky et al. | 445/24 |
| 5,063,327 | 11/1991 | Brodie et al. | 313/482 |

FOREIGN PATENT DOCUMENTS

| | | |
|---|---|---|
| 1114000 | 12/1981 | Canada . |
| 0050294 | 4/1982 | European Pat. Off. . |
| 0460567A3 | 12/1991 | European Pat. Off. . |
| 2344951 | 10/1977 | France . |
| 4-324235 | 11/1992 | Japan . |
| WO/00808 | 1/1990 | WIPO . |

OTHER PUBLICATIONS

IBM Technical Disclosure Bulletin, vol. 23, No. 7B, pp. 3282–3283, Dec. 1980.

IBM Technical Disclosure Bulletin, vol. 21, No. 8, p. 3254, Jan. 1979.

J. B. Landermann, K. C. Park and T. Takamori, "Spacing Technique for Gas Discharge Panel", IBM Tech. Discl. Bull., vol. 21, No. 5, p. 2113, Oct. 1979.

Primary Examiner—Michael Horabik
Assistant Examiner—Michael Day
Attorney, Agent, or Firm—David Aker

[57]                    ABSTRACT

A spacer (60) for spacing the screen of a flat panel display from the backplate of the display comprises an extrusion (62) formed from a dielectric inorganic material for supporting the screen relative to the back plate, and a layer (64) of attachment material located at one end of the extrusion (62) for attaching the extrusion (62) to the backplate of the display. The spacer (60) has a cross-shaped cross section providing increased stability, without a significant increase in visibility.

14 Claims, 6 Drawing Sheets

SPACERS FOR FLAT PANEL DISPLAYS

FIELD OF THE INVENTION

The present invention relates to spacers for flat panel displays such as field emission displays.

BACKGROUND ART

U.S. Pat. No. 4,857,799 describes an example of a conventional colour field emission display. Such displays typically comprise a cathodoluminescent screen overlying and spaced from a two dimensional matrix of field emission cathodes. U.S. Pat. Nos. 3,789,471, 3,665,241, and 3,775,704 describe examples of, and methods of producing such cathodes. Each cathode comprises three arrays of field emissive tips. Each array covers a surface area of typically 300×300 microns. The arrays each comprise substantially the same number of tips (typically 1000). The screen is divided into a plurality of pixels. Each pixel is divided into three sub-pixels. Each sub-pixel is formed by a phosphor corresponding to a different one of the three primary colours, Red, Green and Blue. Each array of a cathode faces a different sub-pixel of a corresponding pixel. The arrays are individually addressable via row and column conductors.

In operation, voltages determined by red, green and blue input video signals are sequentially applied to the row and column conductors to address each cathode in turn in a raster fashion. The voltages interact to generate a localised high electric field at each tip. The localised electric fields cause electrons to be emitted from the tips by a tunnelling mechanism. The electrons are collectively accelerated towards the phosphors by an electric field generated between the screen and the cathode matrix. The phosphors are excited by incident electrons to display an image as a function of the input video signals.

In some conventional field emission displays, the screen is spaced from the cathodes by ball spacers of 200 micron diameter. The spacers are formed from a dielectric material. The dielectric material can be a plastics material such as polypropylene or an inorganic material such as glass. An organic adhesive secures the spacers in place. However, such adhesives tend to volatilise in evacuated environments such as the interior of the display. The volatilised adhesive contaminates the otherwise clean interior of the display. This can degrade the performance of the display. Furthermore, each spacer obscures a substantial portion of the underlying cathode.

In other conventional field emission displays, the screen is spaced from the cathodes by an array of pillars etched from a deposited film of polyimide of a thickness in the range 100 to 200 microns. The pillars permit displays with high aspect ratios to be fabricated. However, the pillars are again organic. Thus, as in the arrangement described above, the performance of the display can be degraded by the volatilisation of the pillar material. Furthermore, the fabrication of the pillars involves typically six or seven process steps that add expense and reduce yield.

In conventional gas plasma displays, spacers are deposited by thick film printing techniques. The spacers are deposited in the form of a ceramic-based ink which is then cured by firing. The disadvantage with this process is that gas plasma displays with spacer aspect ratios greater than 2:1 are difficult to achieve.

SUMMARY OF THE INVENTION

In accordance with the present invention, there is now provided a spacer for spacing the screen of a flat panel display from the backplate of the display, the spacer comprising an extrusion formed from a dielectric inorganic material for supporting the screen relative to the back plate, and a layer of attachment material located at one end of the extrusion for attaching the extrusion to the backplate of the display. Because the spacers of the present invention are not composed of organic material, they do not affect the performance of the flat panel display.

Preferably, the extrusion has a cross-shaped cross-section to increase the stability of the spacer without increasing its visibility to the viewer of the display. The width of the spacer preferably matches the interpel gap of the display.

The extrusion may be conveniently formed from glass or ceramic.

The attachment layer may be formed from glass. In a preferred embodiment of the present invention, the extrusion is formed from transparent glass, and the attachment material is formed from opaque glass. This permits the spacers to be positioned on the back plate by supplying a two dimensional array of spacers mounted on a carrier substrate to a pick and place head; picking a spacer from the array using the pick and place head; placing the picked spacer at an attachment site on the back plate; and, guiding a laser pulse from a laser output in the pick and place head through the extrusion to the attachment layers to melt the attachment layer and thereby bond the spacer to the back plate. Alternatively the attachment layer may be formed from metal. This permits the spacers to be positioned on the back plate by supplying a two dimensional array of spacers mounted on a carrier substrate to a pick and place head; picking a spacer from the array using a pick and place head; placing the picked spacer at an attachment site on the back plate; and, ultrasonically bonding the attachment layer to the back plate using an ultrasonic horn located in the pick and place head. This allows accurate placement of spacers on the back plate in less time (typically 3.5 minutes for 100 spacers) than the time required to complete spacer placement by the aforementioned conventional photolithography technique. Furthermore, the pick and place head can be fitted with a vision system to reject imperfect spacers and detect unsuccessful attachments. The pick and place head can perform immediate reworks of unsuccessful attachments. Thus, the present invention allows very high manufacturing yields to be achieved.

The aforementioned carrier substrate may be in the form of a flexible web in which a bend may be formed by moving the carrier substrate along an angled path to sequentially expose each row of spacers in the array to the pick and place head for easier access.

Viewing another aspect of the present invention, there is provided apparatus for the spacing the screen of a flat panel display from the backplate of the display, the apparatus comprising an extrusion of inorganic dielectric material for supporting the screen relative to the backplate, and an attachment layer located on the backplate for attaching the extrusion to the backplate. The attachment layer preferably comprises an ultrasonically deformable metal.

The present invention further extends to a method of attaching spacers to the back plate of a flat panel display, the method comprising: supplying a fibre of inorganic dielectric material to a positioning head; placing the free end of the fibre at an attachment site formed from ultrasonically deformable metal on the back plate; sinking the free end of the fibre into the attachment site using an ultrasonic horn located in the positioning head; and, cutting a length of the fibre measured from attachment site using a guillotine located in the positioning head.

Viewing yet another aspect of the present invention, there is provided a method for fabricating spacers for spacing the screen of a flat panel display from the backplate of the display, the method comprising: depositing a first metal layer on an inorganic dielectric substrate; depositing a layer of photoresist on the first metal layer; processing the photoresist to expose the metal attachment through an array of apertures in the photoresist; depositing a second metal layer on the photoresist; bonding a carrier substrate to the second metal layer; defining an array of spacers in the dielectric substrate; etching the first metal layer and the photoresist to leave each of the spacers attached to the second metal layer by a frangible neck of metal. This allows very high density spacer arrays to be fabricated, leading to a saving in process time and cost which is in direct ratio to the density of spacers in the array to the density of spacers in the display.

Viewing a further aspect of the present invention, there is provided a method for fabricating spacers for spacing the screen of a flat panel display from the backplate of the display, the method comprising: depositing a layer of attachment material on an inorganic dielectric substrate; bonding the layer of attachment material to a carrier substrate; and dicing the dielectric substrate to define an array of spacers.

The step of depositing the layer of attachment material may include spin-coating the dielectric substrate with a layer of glass. Alternatively, the step of depositing the layer of attachment material may include electro-depositing a layer of metal on the dielectric substrate.

Viewing still another aspect of the present invention, there is provided a method for attaching spacers to the back plate of a flat panel display, the method comprising: supplying a fibre of inorganic dielectric material to a positioning head; depositing a layer of metal on the free end of the fibre by dipping the free end of the fibre in a reservoir of molten metal; placing the free end of the fibre at an attachment site on the back plate; welding the layer of metal on the free end of the fibre to the attachment site using an ultrasonic horn in the positioning head; and, cutting a length of the fibre measured from the weld using a guillotine located in the positioning head.

It will be appreciated that the present invention extends to a flat panel display such as a field emission display or a gas plasma panel comprising spacers as described in the preceding eleven paragraphs.

BRIEF DESCRIPTION OF THE DRAWINGS

Preferred embodiments of the present invention will now be described with reference to the accompanying drawings in which.

DETAILED DESCRIPTION OF THE PREFERRED EMBODIMENTS

Figure 1:
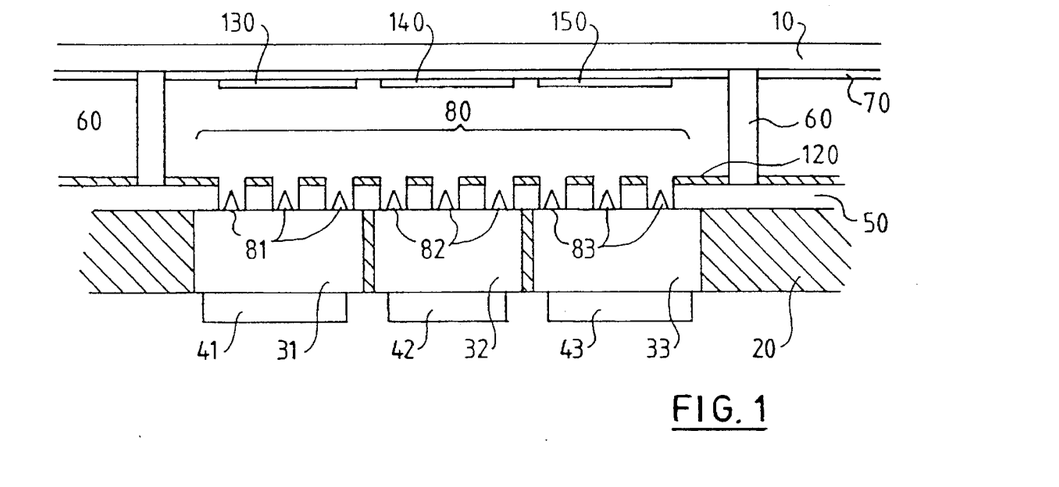
FIG. 1 is a cross-section view of a field emission display.

Referring first to FIG. 1, a colour field emission display comprises a transparent screen 10 superimposed and spaced from a non conductive back plate 20 of Silicon Dioxide for example. The surface of the screen 10 facing the back plate 20 carries a transparent conductive layer 70 of Indium Tin Oxide for example. A matrix of cathodes 80 is provided on the surface of the back plate 20 facing the face plate 10. Each cathode 80 comprises three arrays 81,82,83 of field emitter tips 81,82,83 of Molybdenum for example. The arrays each occupy substantially equal areas. Each array corresponds to a different one of the three primary colours, Red, Green, and Blue. The tips are about 1.4 um in diameter at a spacing of around 5 um. The area of each array is typically 250 square um.

The arrays 81,82,83 are each provided with a conductive base 31,32,33 of Amorphous Silicon for example extending through the back plate 20. The bases 31,32,33 of the arrays of the cathodes in each column of the matrix are interconnected by conductive strips or column conductors 41,42,43 of Niobium for example. The tips project towards the face plate 10 from pits formed in an insulator layer 50 of Silicon Dioxide for example. A conductive gate layer 120, of Niobium for example, is carried on the surface of the insulator layer 50 facing the screen 10. The gate layer 120 is common to each of the arrays 81,82,83 in each cathode. The gate layer 120 along each row of cathodes of the matrix array is connected to form a conductive strip or row conductor 120. Each array 81,82,83 of each cathode 80 of the display therefore can be addressed by orthogonal address lines in the form of the column conductors 41,42,43 connected to the bases 31,32,33 of the cathode 80 and the row conductor 120 perforated by the pits in which the tips of the array 81,82,83 are located.

Phosphor strips 130,140,150 corresponding to the three primary colours R,G and B are provided on the conductive layer 70. Each one of the strips 130,140,150 faces a different one of the arrays 81,82,83. The space between the screen 10 and the back plate 20 is evacuated. Therefore, dielectric spacers 60 of length around 200 um and width around 20 um are provided between screen 10 and the back plate 20 to prevent distortion of the space. The spacers 60 are typically positioned about 20 mm from each other and maintain a distance of typically 200 um between the back plate 20 and the screen 10. Typically 100 spacers are used in a 26 cm display panel. The number of spacers used is optimised as a function of the compressive strength of the spacer material and the thickness and elastic moduli of the materials used to form the plates 10 and 20.

The back plate 20, conductors 40,120 and insulator layer 50 can be fabricated by conventional photolithography in combination with conventional processes such as planar diffusion, electrochemical etching, chemical vapour deposition or the like. The pits in which the tips are located can be ion etched into the insulator layer 50. The tips themselves can be fabricated by a combination of Electron Beam Evaporation and electrochemical etching. To mechanically strengthen the display, the backplate 20 may be fabricated on a glass substrate.

Figure 2:
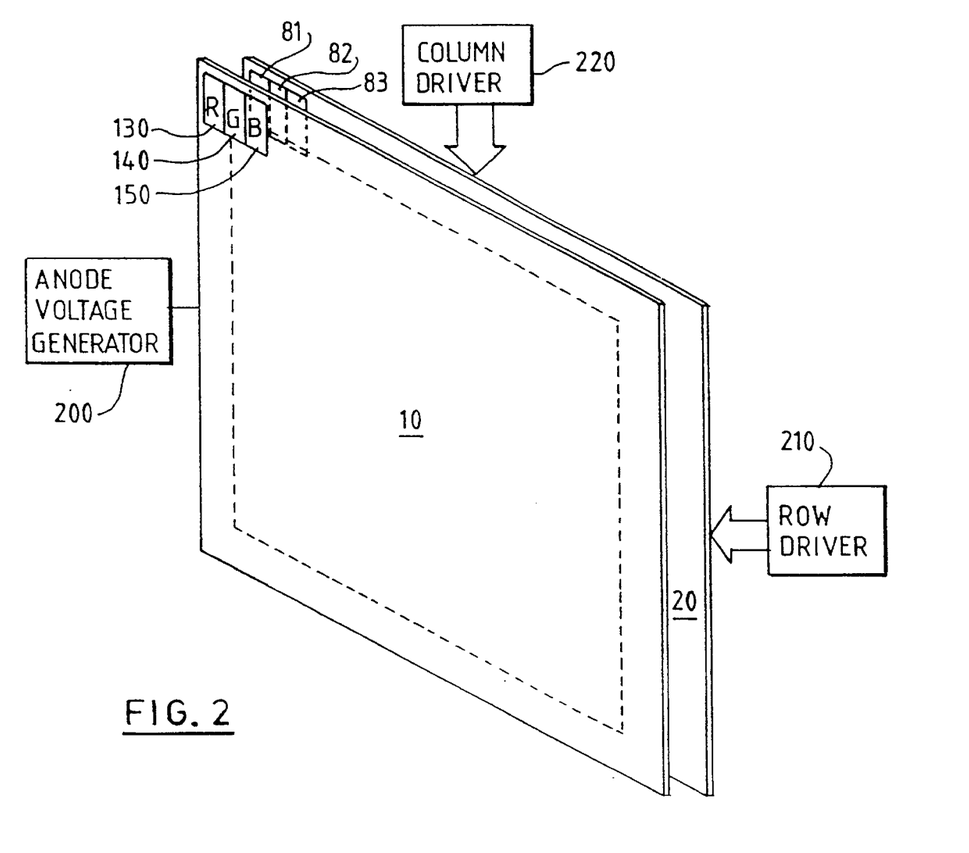
FIG. 2 is a perspective view of a field emission display.

Referring now to FIG. 2, the conductive coating 70 is connected to an anode voltage generator 200, the column conductors are connected to a column driver 210, and the row conductors are connected to a row driver 220. In operation, the anode voltage generator 200 applies an anode voltage of around 400 V to the conductive layer 70 hereinafter referred to as the anode 70. The column driver 210 applies a drive voltage of around −30 V to the row conductors 90,100,110. The drive voltage is transmitted to the tips in the arrays 81,82,83 via the bases 30. The row driver 220 applies a bias voltage of typically 50 V to the row conductors 90,100,110 forming the gates. The voltages on the row and column conductors cooperate in generating localised high electric fields to drag electrons form each tip. The electrons are collectively accelerated towards the phosphors 130,140, 150 by the high electric field produced at the anode 70. Each tip emits electrons in typically a thirty degree cone diverging towards the phosphors 130,140,150. The total electron beam current from an array comprising, for example, 1000 tips is around 100 uA. The phosphors 130,140,150 are excited by the incident electrons to generate the displayed image. Each cathode 80 corresponds a pixel of the displayed image. Each array of the cathode corresponds to one of the Red, Green and Blue sub-pixels of each pixel of the displayed image.

The row and column conductors are typically scanned by the drivers 210,220 to sequentially address drive and bias voltages to the arrays 81,82,83 of each cathode 80 in a raster fashion. The drivers 210,220 can be conventional liquid crystal display or plasma panel address drivers for example. The drive voltage on each cathode is maintained constant but the three gate voltages per cathode are varied as functions of Red, Green and Blue video signals respectively to produce the displayed image.

Figure 3A:
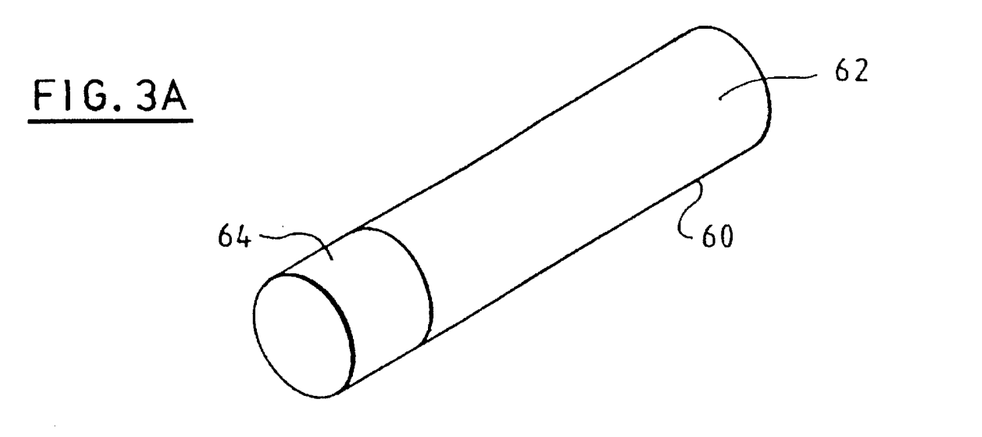
FIGS. 3A, 3B and 3C are perspective views of preferred spacers of the present invention.
Figure 3B:
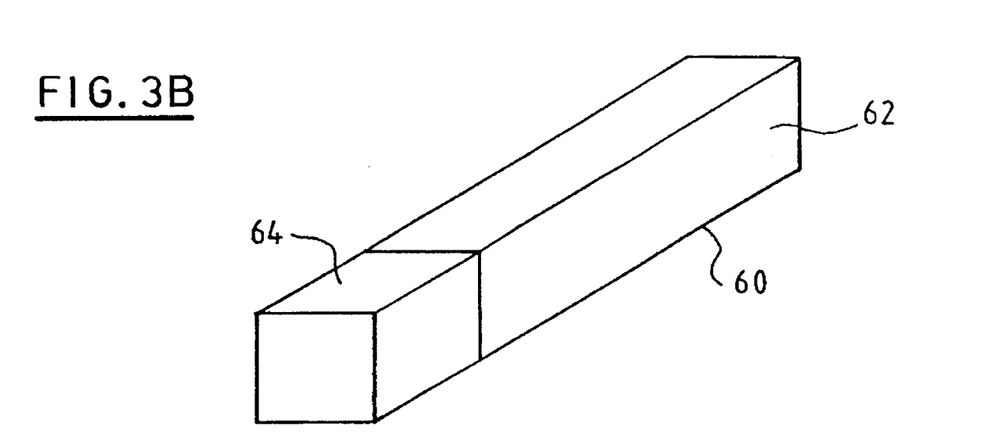
Figure 3C:
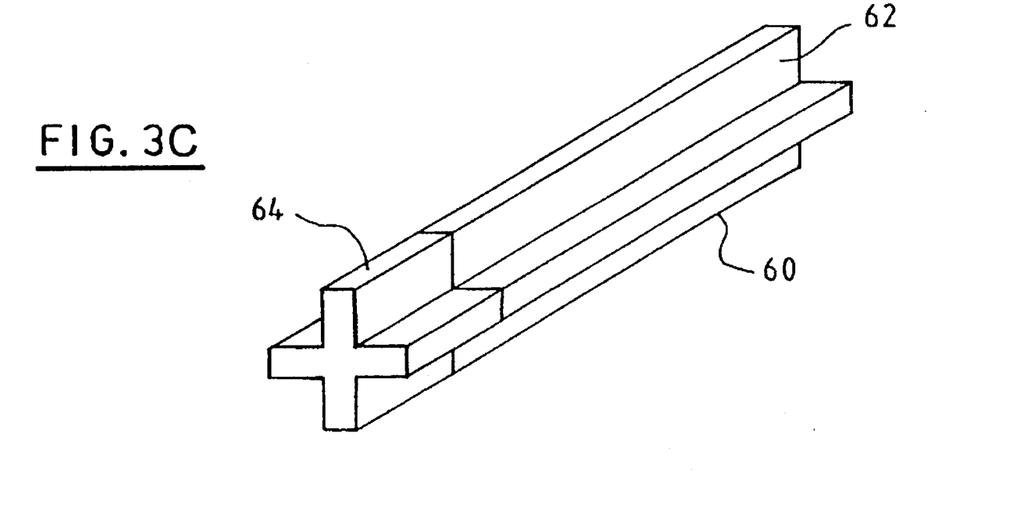

Referring now to FIGS. 3A, 3B and 3C, in accordance with the present invention, each spacer 60 comprises an extrusion or elongate length 62 of inorganic dielectric material such as ceramic or glass. One end of the extrusion 62 is tipped at 64 with a layer of attachment material for attaching the extrusion 62 to the back plate 20 of the display. Referring to FIGS. 3A and 3B, the spacers of the present invention may have circular and or rectangular cross sections. Referring to FIG. 3C, in a preferred arrangement of the present invention, the spacers 60 have a cross-shaped cross section to provide increased stability without a significant increase in visibility.

Figure 4:
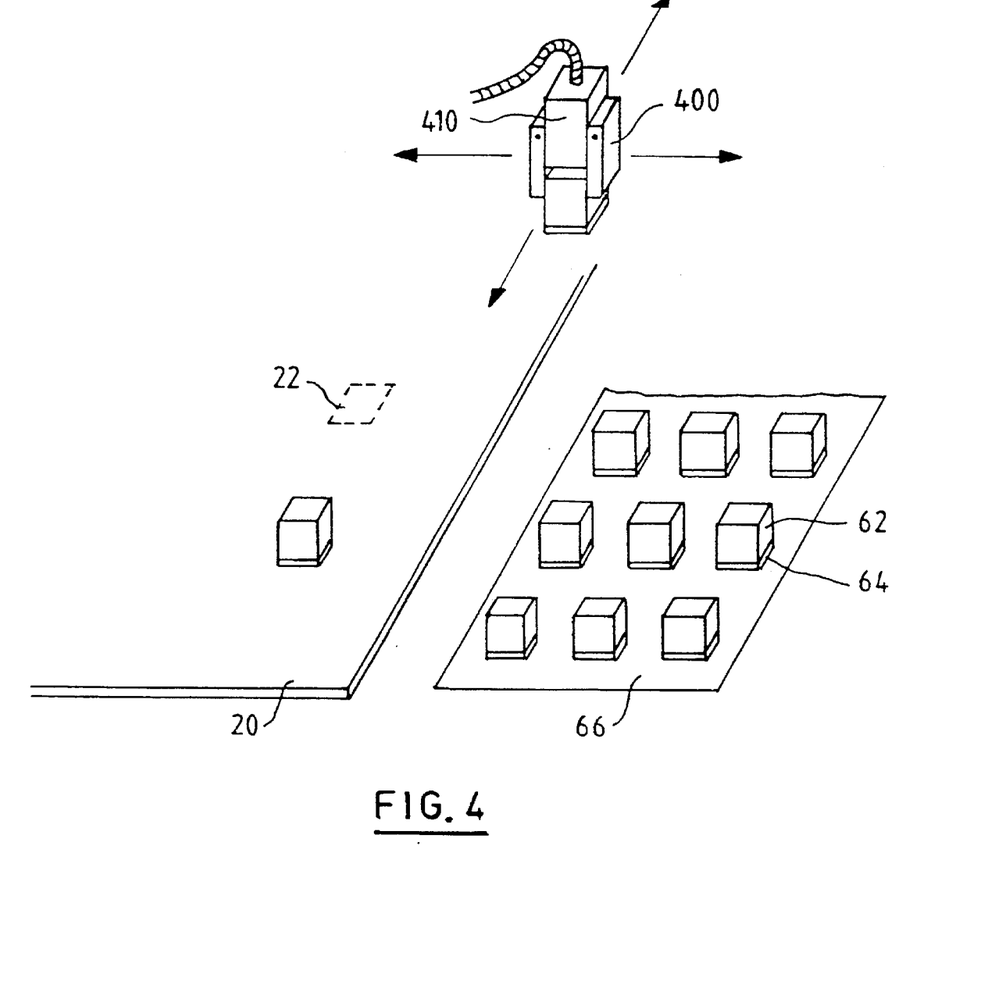
FIG. 4 is a perspective view of a preferred example of apparatus for positioning spacers in accordance with the present invention.

Referring now to FIG. 4, in a preferred process for assembling field emission displays in accordance with the present invention, the spacers 60 are supplied to a pick and place head 400 in a two dimensional array 66. A sealing frit (not shown) is then applied to the back plate for later sealing the back plate 20 to the screen 10. The pick and place head 400 then picks each spacer 20 sequentially from the array 66 and positions it on an attachment site 22 of the back plate 20 under the automated control of a vision system (not shown). Each spacer 60 is attached to the back plate 20 after placement by energising the attachment material 64 using a suitable energy source 410 located in the pick and place head 400. Once all the spacers 60 are attached to the back plate 20, the screen 10 is placed on the back plate 20. At this stage, the screen 10 is supported by the sealing frit and not the spacers 60. The sealing frit is then reflowed, thereby allowing the screen 10 to be supported by the spacers 60. The display is then sealed and evacuated or assembled under vacuum conditions. The spacers 60 are thus held in compression by elastic deformation of the back plate 20 and the screen 10.

Figure 5A:
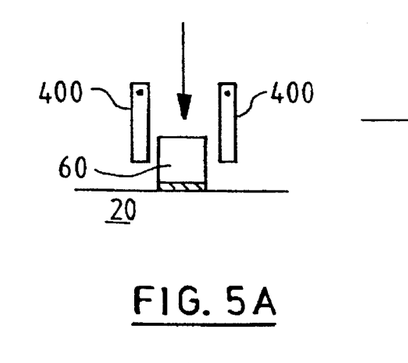
FIGS. 5A and 5B are side views of the apparatus shown in FIG. 4 in operation.
Figure 5B:
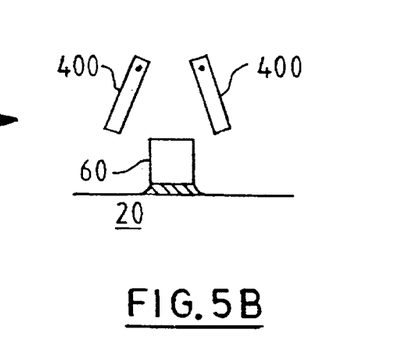

Referring now to FIGS. 5A and 5B, in a preferred example of the present invention, the extrusion 62 is transparent and the attachment material 64 is a solder-glass with a melting point significantly lower than that of the backplate. A laser pulse of a wavelength to which the solder-glass is opaque is used to melt the glass. In the process described above, each spacer 60 is attached to the back plate 20 by melting the glass layer 64 with the laser pulse E transmitted through the extrusion 62 from a laser output 410 in the pick and place head 400.

In another preferred example of the present invention, the attachment material 64 is an ultrasonically weldable metal with good adhesion properties to the extrusion 62. Examples of such a metal include Aluminium and Gold. In the process described above, each spacer 60 is attached to the back plate 20 after placement by ultrasonically welding the metal to metallised spacer sites 22 on the back plate 20 using an ultrasonic horn 410 located in the pick and place head 400 instead of the laser used in the previous example. The metallised spacer sites 22 are in the form of electrically isolated islands on the display substrate to prevent short circuits in the display drive circuitry.

Figure 6:
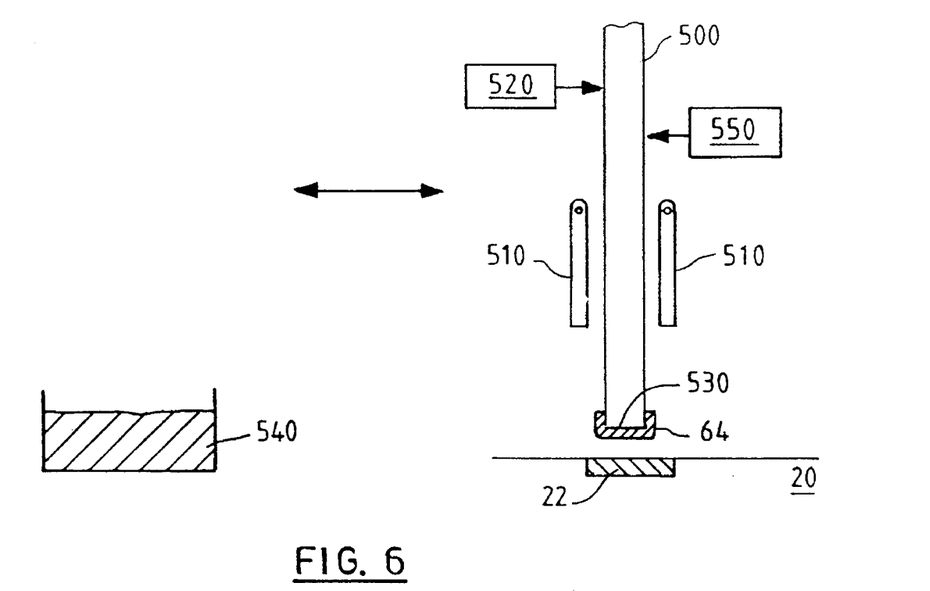
FIG. 6 is a side view of another preferred example of apparatus for positioning spacers in accordance with the present invention.

Referring to FIG. 6, in another preferred process for assembling field emission displays in accordance with the present invention, the spacers 60 are supplied in the form of a continuous fibre 500 to a positioning head 510 comprising an ultrasonic horn 520. After application of the sealing frit to the back plate 20, but before each spacer placement, the free end 530 of the fibre 500 is dipped in a reservoir 540 of molten metal. The metal-coated free end 530 is then placed at a spacer site 22 on the back plate 20 and welded into position by the ultrasonic horn 520. A controlled length of fibre 500 is then dispensed from the positioning head 510 and guillotined off by a cutter 550.

Figure 7A:
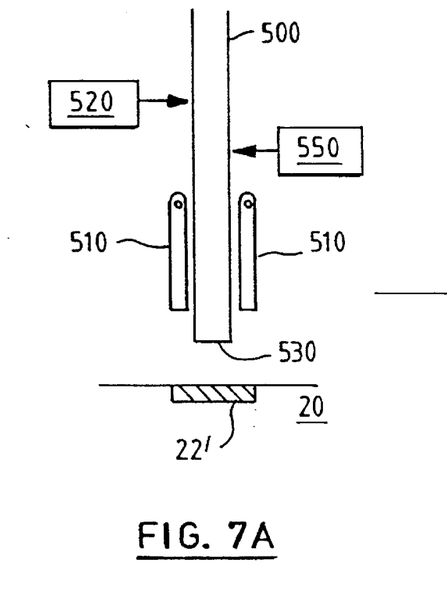
FIGS. 7A and 7B are side views of yet another example of apparatus for positioning spacers in accordance with the present invention.
Figure 7B:
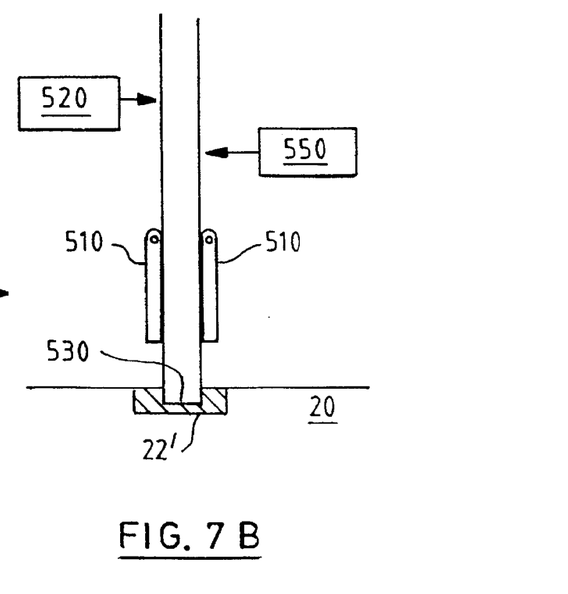

Referring now to FIGS. 7A and 7B, in a modification of the above process, the free end 530 of the fibre 500 is not coated with metal between each spacer placement. Instead, the free end 530 is sunk into deformable spacer sites 22' on the back plate 20 by application of ultrasonic energy. In FIGS. 7A and 7B, the deformable spacer sites 22' are recessed into the back plate 20. However, in other embodiments of the present invention, the deformable spacer sites may stand proud from the surface of the back plate 20.

Good adhesion between the spacers 60 and the back plate 20 is not required because the spacers 60 are held in place by compression after the display is sealed and evacuated.

Figure 8:
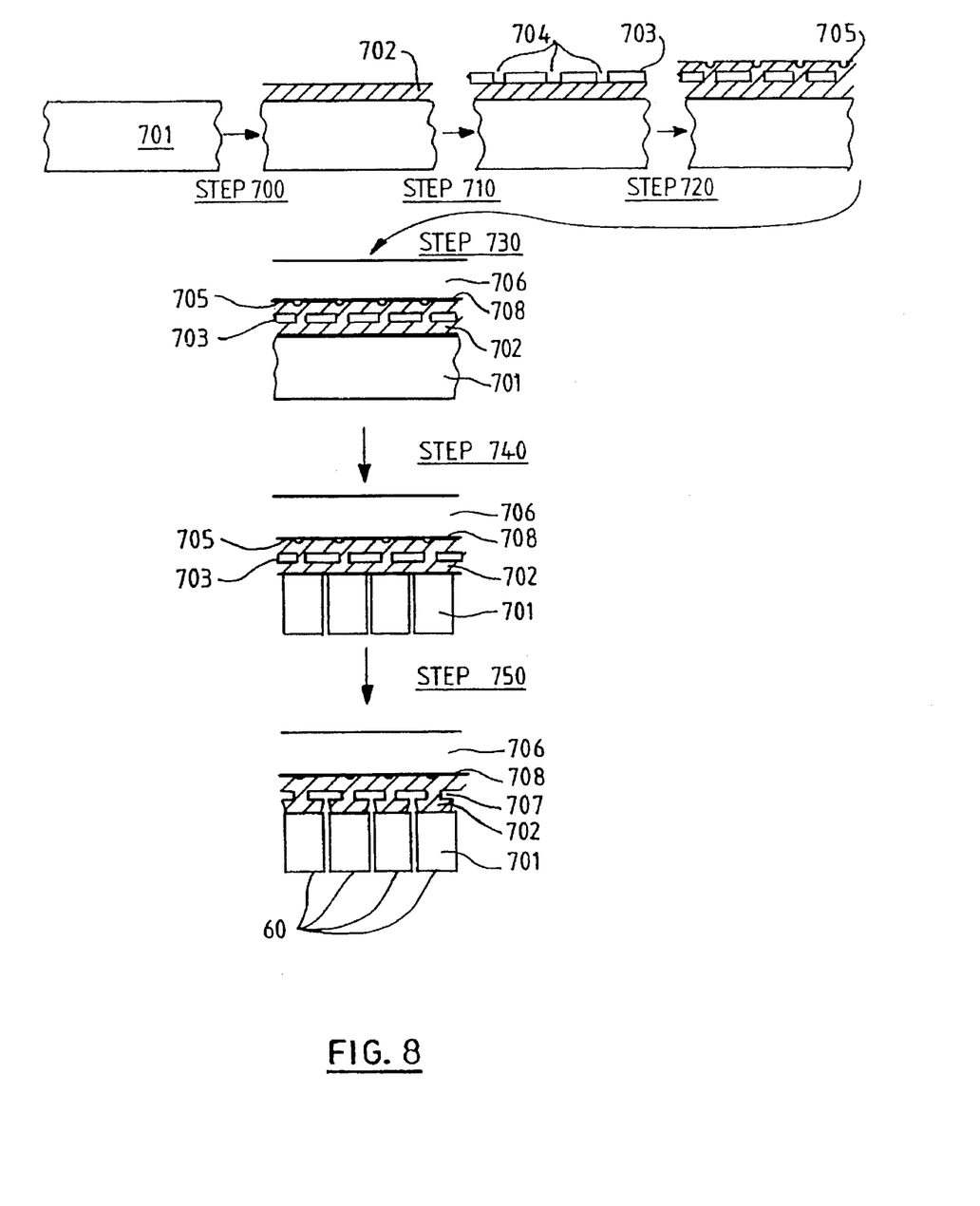
FIG. 8 is a process flow diagram illustrating a preferred method of fabricating spacers of the present invention.

Referring now to FIG. 8, in a preferred process for fabricating an array 66 of spacers 60 of the present invention, a metal attachment layer 702 is first deposited on a dielectric substrate 701 by, for example, electroless seeding followed by electroplating. A layer of photoresist 703 is then deposited on the metal attachment layer 702. The photoresist 703 is exposed through a mask and developed to leave an array of apertures 704 through the photoresist 703 down to the metal attachment layer 702. A second metal attachment layer 705 is deposited on the developed photoresist 703 by, for example electroless seeding followed by electroplating. A carrier substrate 706 is bonded to the second metal attachment layer 705 by an adhesive 708. The adhesive may be any thermoplastic or thermo-setting adhesive which is compatible with subsequent processes, such as, for example, epoxy. The spacers 60 may be defined in the dielectric substrate 701 by photolithography or through the use of a dicing saw. Photolithography allows definition of spacers 60 with cross sections other than rectangular, such as circular or cross-shaped, for example. The metal attachment layer 702 between the spacers 60 and the remaining photoresist 703 are etched to leave each spacer 60 attached to the carrier substrate 706 by a frangible neck 707 of metal. Each neck 707 can easily be broken to release the corresponding spacer 60 during the pick and place operation described above.

Figure 9:
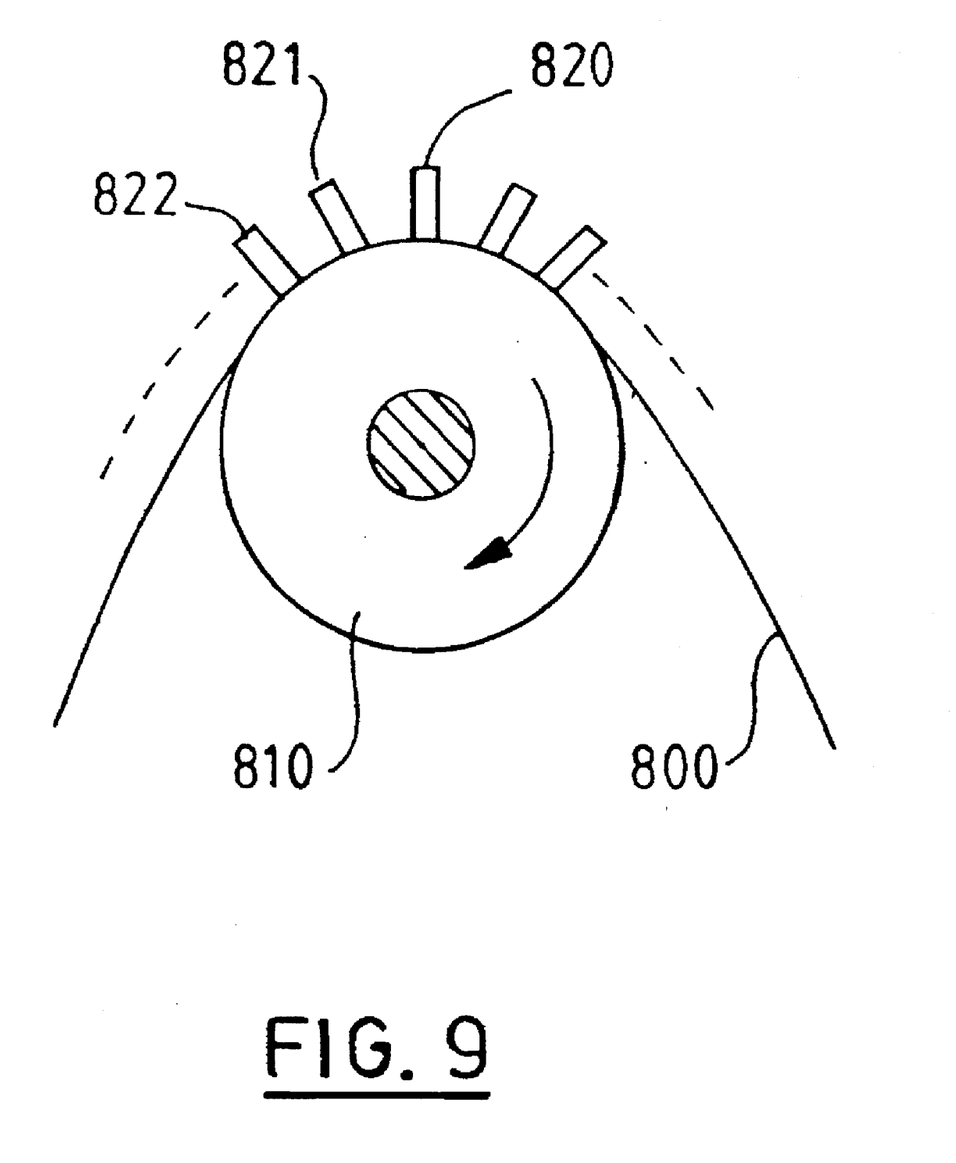
FIG. 9 is a side view of an array of spacers of the present invention passing over a roller.

In another preferred process for fabricating spacers 60 of the present invention, a glass layer is spin-coated or screened onto a dielectric substrate and then reflowed. The dielectric substrate is then attached, via a low tack adhesive such as a pressure sensitive silicone or acrylic adhesive, to a carrier substrate. The spacers can be readily detached from the low tack adhesive during the pick and place operation described above. In a modification to the above process, a metal layer is deposited on the dielectric substrate instead of the glass layer. The metal layer is deposited by electroless seeding and electroplating. Referring to FIG. 9, the carrier substrate is preferably in the form of a flexible web 800 which, in use, is guided for movement over a roller 810 in the pick and place apparatus. The web 800 is bent through an angle as it passes over the roller 810 to sequentially expose successive rows 820–822 of spacers 60 to the pick and place head 400.

Preferred examples of the present invention have been hereinbefore described with reference to a colour field emission display. It will now be appreciated, however, that the present invention is equally applicable to monochrome field emission displays.

I claim:

1. In a flat panel display having a screen and a backplate, at least one spacer (60) for spacing the screen from the backplate to forming a space between said screen and said backplate, means for sealing said space, said compression space being sufficiently evacuated so that said at least one spacer is compressed between said backplate, the spacer (60) comprising an extrusion (62) formed from a dielectric inorganic material for supporting the screen relative to the backplate, and a layer (64) of attachment material located at one end of the extrusion (62) for attaching the extrusion (62) to the backplate of the display, wherein the extrusion has a cross-shaped cross section said cross-shaped cross section providing sufficient stability to maintain said backplate and said screen spaced apart under said compression.

2. A display as claimed in claim 1, wherein the extrusion is formed from glass.

3. A display as claimed in claim 2, wherein the attachment layer is formed from glass.

4. A display as claimed in claim 2, wherein the attachment layer is formed from a metal.

5. A display as claimed in claim 1, wherein the extrusion is formed from a ceramic.

6. A display as claimed in claim 1, wherein the extrusion is formed from transparent glass, and the attachment material is formed from opaque glass permitting light to pass through the extrusion to melt the attachment material to bond the extrusion to the backplate.

7. A spacer as claimed in claim 1, wherein the attachment layer comprises an ultrasonically deformable metal.

8. A flat panel display comprising a screen having a plurality of pels with gaps between the pels, a backplate, and a plurality of spacers (60) for spacing the screen from the backplate to forming a space between said screen and said backplate, means for sealing said space to said compression space being sufficiently evacuated so that said at least one spacer is compressed between said backplate, the spacers (60) including an extrusion (62) formed from a dielectric inorganic material for supporting the screen relative to the backplate, and a layer (64) of attachment material located at one end of the extrusion (62) for attaching the extrusion (62) to the backplate of the display, wherein the extrusion has a cross-shaped cross section; width of the spacer being selected to match the gaps between the pels said cross-shaped cross section providing sufficient stability to maintain said backplate and said screen spaced apart under said compression.

9. A display as claimed in claim 8, wherein the extrusion is formed from glass.

10. A display as claimed in claim 9, wherein the attachment layer is formed from glass.

11. A display as claimed in claim 9, wherein the attachment layer is formed from a metal.

12. A display as claimed in claim 8, wherein the extrusion is formed from a ceramic.

13. A display as claimed in claim 8, wherein the extrusion is formed from transparent glass, and the attachment material is formed from opaque glass permitting light to pass through the extrusion to melt the attachment material to bond the extrusion to the backplate.

14. A display as claimed in claim 8, wherein the attachment layer comprises an ultrasonically deformable metal.

\* \* \* \* \*